(12) United States Patent
Kuwazawa

(10) Patent No.: US 7,583,306 B2
(45) Date of Patent: Sep. 1, 2009

(54) SOLID STATE IMAGING DEVICE WITH REDUCED CELL PITCH AND DRIVING METHOD THEREOF

(75) Inventor: Kazunobu Kuwazawa, Nagano (JP)

(73) Assignee: Seiko Epson Corporation (JP)

( * ) Notice: Subject to any disclaimer, the term of this patent is extended or adjusted under 35 U.S.C. 154(b) by 755 days.

(21) Appl. No.: 11/176,772

(22) Filed: Jul. 7, 2005

(65) Prior Publication Data

US 2006/0028565 A1 Feb. 9, 2006

(30) Foreign Application Priority Data

Aug. 9, 2004 (JP) ............................. 2004-231912

(51) Int. Cl.
*H04N 3/14* (2006.01)
*H04N 5/335* (2006.01)

(52) U.S. Cl. .................. 348/300; 348/241; 257/233

(58) Field of Classification Search ............. 250/208.1, 250/208.6, 214.1; 348/294, 314, 315, 275, 348/246, 241, 248, 311, 308, 303, 302, 301, 348/300, 299; 257/222, 215, 225, 292, 233, 257/242, 220, 230
See application file for complete search history.

(56) References Cited

U.S. PATENT DOCUMENTS 6,448,596 B1 * 9/2002 Kawajiri et al. ............. 257/292
7,342,270 B2 * 3/2008 Kuwazawa ................. 257/292

(Continued)

FOREIGN PATENT DOCUMENTS

JP 58-050874 3/1983

(Continued)

*Primary Examiner*—Lin Ye
*Assistant Examiner*—Nelson D Hernández Hernández
(74) *Attorney, Agent, or Firm*—Harness, Dickey & Pierce, P.L.C.

(57) ABSTRACT

A solid state imaging device, including: a plurality of storage wells which stores an optically generated charge that is generated at a photoelectric conversion region corresponding to an incident light, the plurality of storage wells being inside a substrate; wherein a plurality of the photoelectric conversion regions is arrayed on the substrate in a two dimensional matrix; a plurality of amplifiers each installed per every pair of the photoelectric conversion regions that are adjacent in one direction of the two dimensional matrix, outputting a pixel signal that corresponds to the optically generated charge retained in a floating diffusion region; a plurality of transfer controlling elements, a pair of which is installed in every pair of the photoelectric conversion regions, changing a potential barrier of an optically generated charge transfer route, the transfer route being between each of the storage wells in the pair of the photoelectric conversion regions and the corresponding floating diffusion region, and controlling a transfer of the optically generated charges; wherein each of the plurality of transfer controlling elements has a transfer gate installed on the substrate being separated by an insulation film, and an electric charge retention region being inside the substrate, retaining the optically generated charge under the transfer gate; and wherein each of the plurality of amplifiers is provided with a transistor, a gate of each transistor having a ring-like shape, each of the gates being installed in a manner that at least a part of the gate is sandwiched by portions which are parts cut-off from each pair of the transfer gates, the pair of the transfer gates being adjacent in one direction of the two dimensional matrix.

13 Claims, 6 Drawing Sheets

U.S. PATENT DOCUMENTS

| | | | |
|---|---|---|---|
| 7,488,997 B2 * | 2/2009 | Kuwazawa | 257/233 |
| 2004/0245433 A1 * | 12/2004 | Koyama | 250/208.1 |
| 2006/0063295 A1 | 3/2006 | Kuwazawa | |

FOREIGN PATENT DOCUMENTS

| | | |
|---|---|---|
| JP | 05-243546 | 9/1993 |
| JP | 2002-064751 | 2/2002 |
| JP | 2002-134729 | 5/2002 |
| JP | 2002-368201 | 12/2002 |
| JP | 2004-087963 | 3/2004 |
| JP | 2006-93263 | 4/2006 |

* cited by examiner

SOLID STATE IMAGING DEVICE WITH REDUCED CELL PITCH AND DRIVING METHOD THEREOF

BACKGROUND OF THE INVENTION

Japanese Patent Application No. 2004-231912, filed on Aug. 9, 2004, is hereby incorporated by reference in its entirety.

1. Technical Field

The present invention relates to a solid state imaging device and a driving method thereof.

2. Related Art

Solid state imaging devices that are mounted on mobile phones, digital cameras or the like, are generally provided with image sensors such as a CCD-type (Charge Coupled Device) image sensor (hereinafter called CCD sensor) or a CMOS-type image sensor (hereinafter called CMOS sensor).

In recent years, a MOS imaging device of a threshold voltage modulation system (hereinafter called modulation type MOS sensor), which combines high image quality and low power consumption, has been suggested. Japanese Unexamined Patent Publication No. 2002-134729 is a first example of related art for a modulation type MOS sensor.

CCD sensors require a high driving voltage, and hence have high power consumption, while they attains the Correlated Double Sampling (CDS) function for removing noise, and the synchronous electronic shutter function for photographing objects that move in high speed without distorting the object's image. This synchronous electronic shutter function eliminates the distortion of the object's image by simultaneously storing optically generated charges for multiple light receiving elements that are arrayed in two dimensions. Thus CCD sensors are generally provided with an advantage of higher quality.

In contrast, a specific type of CMOS sensor called CMOS-APS (Active Pixel Sensor) having a 4-transistors structure, attains the CDS function, while it does not attain the synchronous electronic shutter function. In general, CMOS sensors have the advantages of a low power consumption due to their low driving voltage and a low process cost. The reason, for which the synchronous electronic shutter function is not employed in common CMOS-APS type sensors, is that they are operated in order to achieve the CDS function. This function resets a floating diffusion (hereinafter FD) per every read-out line, where the FD retains an electric charge, first reading out a noise component, and subsequently reading out a signal component.

More specifically, in order to attain the CDS function in CMOS-APS sensors, transistors transferring electric charges are sequentially reset at every selected line from which an image signal is read out, first reading out the noise component, and subsequently reading out the signal component. The read-out of the signal component is performed while the transistors are sequentially reset per every selected line. Therefore, the read-out timings gradually deviate from the first read-out line to the last read-out line when objects moving in high speed are photographed, resulting in a distortion of the image obtained from the object.

While it is not impossible to materialize the synchronous electronic shutter function in CMOS-APS type sensors, the above-mentioned transfer transistors are also used for this function. Therefore, the CDS function cannot be attained together with the synchronous electronic shutter function in the CMOS-APS type sensors, involving a problem of image quality degradation.

In the modulation type MOS sensor that is disclosed in the first example of related art, the signal component is first read-out, and after the reset, the noise component is read out. Consequently, the difference between those two signal components is output as a pixel signal.

In the case of this modulation type MOS sensor, a noise component that remained after the previous reset is included in a signal component being read out, while a noise component that remained after the current reset is read out subsequently afterwards. There is no guarantee that the quantity of the noise component remaining from the previous reset, which is included in the signal component, and that of the noise component remaining from the current reset, are the same. In other words, the previous noise component, not the current noise component, is included in the output pixel signal. Therefore, in the case of the modulation type MOS sensor, the signal component and the noise component have not been correlated, and there has been a drawback that the noise is not removed accurately. This leads to degradation of the image quality.

Japanese Unexamined Patent Publication No. 2004-87963 is a second example of related art for modulation type MOS sensor, in which the technique for attaining the synchronous electronic shutter is suggested for modulation type MOS sensors. In case of the technique related to this suggestion, the entire pixel is reset at once, and thereafter the read-out of pixel signals is performed per every line.

Further, in case of the modulation type MOS sensor related to those suggestions, a ring gate is used for a modulation transistor. Each of the plurality of sensor cells arranged in a two dimensional matrix on a substrate have one ring gate for one photodiode.

However, in the technique according to the second example of the related art mentioned above, upon reading out a pixel signal, the signal component is first read out, and after the reset the noise component is subsequently read out. Hence the signal component and the noise component are not correlated, where the problem of the noise not being removed accurately still remains.

Moreover, in the case of the modulation type MOS sensor according to the first and the second example of the related art mentioned above, a distance between the ring gate of the modulation transistor and a drain, needs to be kept wider than a certain distance, in order to maintain the efficiency of modulation. Therefore, it involves a problem of not being able to make the modulation type MOS sensor microscopic, since in the modulation type MOS sensor, the width of the ring gate needs to be larger than a certain width.

SUMMARY

An advantage of the invention is to provide a solid state imaging device that enables to attain the synchronous electronic shutter function while attaining the CDS function, and to make a cell pitch smaller and microscopic.

According to one aspect of the invention, a solid state imaging device includes: a plurality of storage wells which stores an optically generated charge that is generated at a photoelectric conversion region corresponding to an incident light, the plurality of storage wells being inside a substrate; wherein a plurality of the photoelectric conversion regions is arrayed on the substrate in a two dimensional matrix; a plurality of amplifiers each installed per every pair of the photoelectric conversion regions that are adjacent in one direction of the two dimensional matrix, outputting a pixel signal that corresponds to the optically generated charge retained in a floating diffusion region; a plurality of transfer controlling elements, a pair of which is installed in every pair of the photoelectric conversion regions, changing a potential barrier of an optically generated charge transfer route, the transfer route being between each of the storage wells in the pair of the photoelectric conversion regions and the corresponding floating diffusion region, and controlling a transfer of the optically generated charges; wherein each of the plurality of transfer controlling elements has a transfer gate installed on the substrate being separated by an insulation film, and an electric charge retention region located inside the substrate, retaining the optically generated charge under the transfer gate; and the plurality of amplifiers each being a transistor, a gate of each transistor having a ring-like shape, each of the gates being installed in a manner that at least a part of the gate is sandwiched by portions which are parts cut-off from each pair of the transfer gates, the pair of the transfer gates being adjacent in one direction of the two dimensional matrix.

With such structure, the solid state imaging device, which enables to attain the synchronous electronic shutter function while attaining the CDS function, and to make a cell pitch smaller and microscopic, can be implemented.

It is preferable that in accordance with an embodiment of the invention, the solid state imaging device, wherein the amplifier is provided with a modulation transistor, have a threshold voltage of a channel being controlled by the electric charge retained in the floating diffusion region, and output the pixel signal that corresponds to the electric charge.

With such structure, in the modulation type MOS sensor, it is possible to attain the synchronous electronic shutter function while attaining the CDS function, and to make a cell pitch smaller and microscopic.

It is preferable that in accordance with an embodiment of the invention, the solid state imaging device, wherein a diffusion layer that is provided with the transfer route between the floating diffusion region and the electric charge retention region, is installed under another diffusion layer in the substrate.

With such structure, a generation of dark current can be suppressed.

It is preferable that in accordance with an embodiment of the invention, the solid state imaging device, wherein a discharging region for discharging the electric charge being redundant at the storage well is provided. With such structure, unnecessary electric charges can be credibly discharged.

According to a further aspect of the invention, a method of driving a solid state image device includes: wherein the solid state image device includes; a plurality of storage wells, which stores an optically generated charge that is generated at a photoelectric conversion region corresponding to an incident light, the plurality of storage wells installed per each pixel and being inside a substrate; wherein a plurality of the photoelectric conversion regions is arrayed on the substrate in a two dimensional matrix; a plurality of amplifiers each installed per every pair of the photoelectric conversion regions that are adjacent in one direction of the two dimensional matrix, outputting a pixel signal that corresponds to the optically generated charge retained in a floating diffusion region; a plurality of transfer controlling elements, a pair of which is installed in every pair of the photoelectric conversion regions, changing a potential barrier of an optically generated charge transfer route, the transfer route being between each of the storage wells in the pair of the photoelectric conversion regions and the corresponding floating diffusion region, and controlling a transfer of the optically generated charges; wherein each of the plurality of transfer controlling elements has a transfer gate installed on the substrate being separated by an insulation film, and a electric charge retention region being inside the substrate, retaining the optically generated charge under the transfer gate; and the plurality of amplifiers each being a transistor, a gate of each transistor having a ring-like shape, each of the gates being installed in a manner that at least a part of the gate is sandwiched by portions which are parts cut-off from each pair of the transfer gates, the pair of the transfer gates being adjacent in one direction of the two dimensional matrix; a storing process, for controlling a potential barrier of the transfer route by the transfer controlling element, and storing the optically generated charge to the storage well, while preventing it from flowing to the electric charge retention region in the very least through the transfer route, for the entire pixels at once; a first transferring process, for controlling the potential barrier of the transfer route by the transfer controlling element, and transferring the optically generated charge stored in the storage well to the electric charge retention region, for the entire pixels at once; a first read-out process, for controlling voltages of the two transfer gates installed corresponding to the pair of photoelectric conversion region, and reading out a noise component from the transistor, in on direction of the matrix; a second transfer process, for transferring, in one direction of the matrix, the optically generated charge from one of the two transfer controlling elements in the electric charge retention regions that correspond to the pair of photoelectric conversion regions, to the floating diffusion region; a second read-out process, for controlling the voltage of the gate installed corresponding to the pair of photoelectric conversion regions, and reading out a signal component from the transistor, based on the transferred optically generated charge.

With such structure, it is possible to attain the driving method of the solid state imaging device, which enables to attain the synchronous electronic shutter function while attaining the CDS function, and to make a cell pitch smaller and microscopic.

BRIEF DESCRIPTION OF THE DRAWINGS

The invention will be described with reference to the accompanying drawings, wherein like numbers refer to like elements, and wherein.

DESCRIPTION OF THE EMBODIMENTS

Figure 1:
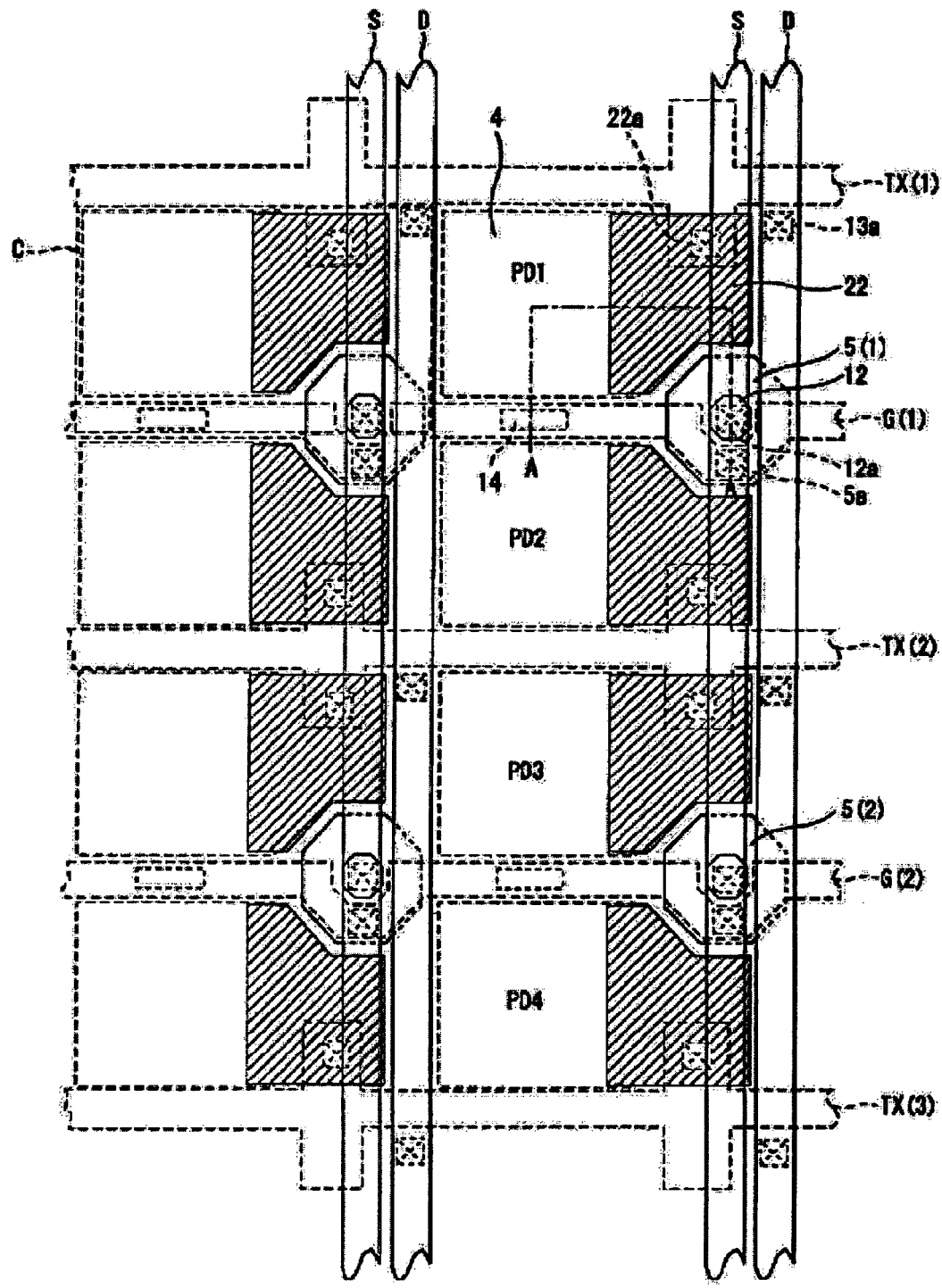
FIG. 1 is a top view drawing showing the shape of the solid state imaging device in the embodiment from the top view.
Figure 2:
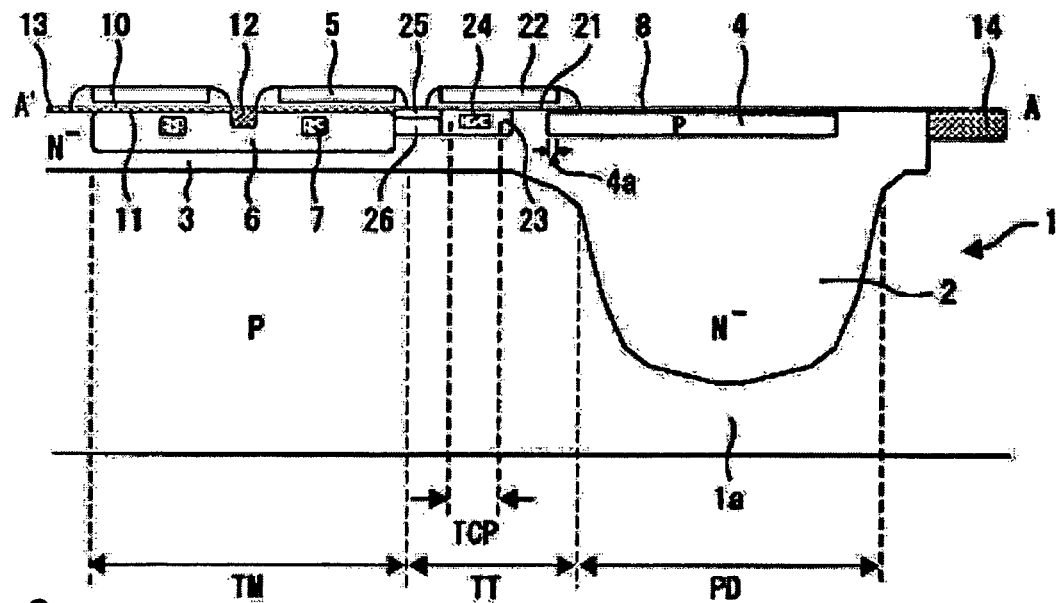
FIG. 2 is a sectional drawing of FIG. 1 along the section A-A line.

Embodiments of the invention will now be described with reference to the drawings. First, the structure of the solid state imaging device in one embodiment of the invention, is described. FIG. 1 is a top view drawing showing the shape of the solid state imaging device in the embodiment from the top view. FIG. 2 is a sectional drawing of FIG. 1 along the section A-A' line.

As shown in FIG. 1, the solid state imaging device in one embodiment of the invention is provided with a sensor cell array, in which a plurality of sensor cells is arranged in a two dimensional matrix form on a substrate plane. Each sensor cell stores optically generated charges, generated in correspondence to incident light, and outputs a pixel signal whose level is based on the stored optically generated charges. Pixel signals for one screen are obtained by arranging sensor cells in matrix form. In FIG. 1, the range shown in a dotted line represents one sensor cell C, which provides a pixel unit. Each sensor cell has a photodiode forming region PD, which provides a photoelectric conversion region. The solid state imaging device in the embodiment is a modulation type MOS sensor. In FIG. 1, 8 sensor cells in the sensor are shown. 4 among the 8 sensor cells are marked as photodiode forming regions PD1 through PD4 (hereinafter each photodiode forming region is called PD). Since each sensor cell has the same structure, the description thereafter refers to the photodiode forming region PD1. Here, in the embodiment, the example of using a positive hole for optically generated charges is shown. However, a similar structure can be achieved, in the case where electrons are used for optically generated charges.

As shown in FIG. 2, a modulation transistor forming region TM that corresponds to the photodiode forming region PD is installed. As shown in FIG. 1, two photodiode forming regions PD are installed for one modulation transistor forming region TM. Two transfer transistor forming regions TT, which transfer electric charges from each of the two photodiode forming regions PD to one modulation transistor forming region TM, are installed between each photodiode forming area PD and the modulation transistor forming region TM.

In the embodiment, a transfer transistor Tr, formed in the transfer transistor forming region TT, is driven by each on of two adjacent selected lines, and transfers the electric charges (optically generated charges), stored in each photodiode forming area PD, to the modulation transistor forming region TM.

Using FIG. 1 and FIG. 2, the structure of the solid state imaging device in one embodiment of the invention is described in more detail. As shown in FIG. 1, the plurality of the photodiode forming regions PD, arranged in matrix form, respectively has an approximately rectangular shape.

The photodiode forming regions PD are formed in the areas set by: source lines S and drain lines D that are installed in the longitudinal direction of the two dimensional matrix; transfer gate lines TX (1), TX (2), TX (3) and so forth, and gate lines G (1), G (2), G (3) and so forth, that are installed in the lateral direction. The gate lines G are installed in straight lines in the lateral direction, while in the portion of a gate 5 (described later) that has a ring-like shape, they are formed in a curve along the shape of the gate 5.

As shown in FIG. 2, each sensor cell is formed on a P-type substrate 1a. On the P-type substrate 1a in the photodiode forming region PD, an N-type well 2 is formed at a deep location in the substrate. In contrast, on the P-type substrate 1a in the modulation transistor forming region TM, an N-type well 3 is formed at a relatively shallow location in the substrate. The amounts of "−" or "+" indicated in FIG. 2 and the description thereof represent the density of dopant. The status of the portion with the subscript "− −" indicates a lower density, and the subscript "+ +" indicates a higher density.

On the N-type well 2 in the photodiode forming region PD, a P layer is formed on approximately the entire surface of the photodiode forming region PD, and this P layer functions as a storage well 4. On the surface side of the substrate, an N+ diffusion layer 8 that functions as a pinning layer is formed in approximately the entire photodiode forming region PD. In the photodiode forming region PD, an opening region is formed on the surface of a substrate 1, and the storage well 4, which is a P-type well provided with a wider region than the opening region, is formed.

Depletion region is formed in the boundary area between the N-type well 2 and the P-type storage well 4 that are formed on the substrate 1 at the lower part of the photodiode forming region PD. In this depletion region, the optically generated charges emerge with an incoming light radiated through the open region that receives light in the photodiode forming region. The optically generated charges generated are stored in the storage well 4.

An N-channel depression MOS transistor, for example, is used as a modulation transistor Tm that serves as an amplifier formed on the modulation transistor forming region TM. On the N-type well 3 in the modulation transistor forming region TM, the gate 5, shaped approximately as a ring (in FIGS. 1 and 3, octagon), is disposed with a gate insulation film 10 therebetween. Hereinafter the gate 5 may also be referred to as "ring gate 5" and in FIG. 1, it is indicated as "gate 5(1)". On the surface of the substrate under the ring gate 5, an N+ diffusion layer 11 that composes a channel is formed. On the surface of the substrate at the center part of the opening portion in the ring gate 5, a source region 12 composed with an N++ diffusion layer is formed. Hereinafter the source region 12 may also be referred to as "source 12". On the N-type well 3 in the modulation transistor forming area TM, a P layer is formed to match the shape of the approximate outer diameter of the ring gate 5 that composes a modulation transistor. The P layer functions as a modulation well 6. In this modulation well 6, a ring-shaped carrier pocket 7, which is a P+ floating diffusion region provided with a high density P-type region, is formed along the ring-like shape of the ring gate 5.

On the surface of the substrate in the periphery of the ring gate 5, an N+ diffusion layer is formed and composes a drain region 13. Hereinafter, the drain region 13 may also be referred to as "drain 13". The N+ diffusion layer 11 that composes the channel is connected to the source region 12 and to the drain region 13.

The modulation well 6 controls a threshold voltage of the channel for the modulation transistor Tm. The modulation transistor Tm is composed of the modulation well 6, the ring gate 5, the source region 12 and the drain region 13. The threshold voltage of the channel changes according to the electric charge stored in the carrier pocket.

Moreover, as shown in FIG. 1, at the prescribed location in the ring gate 5, a gate contact region 5a of an N+ layer is formed in the vicinity of the surface of the substrate 1. At the prescribed location of the source region 12, a source contact region 12a of the N+ layer is formed in the vicinity of the surface of the substrate 1. At the prescribed location of the drain region 13, a drain contact region 13a of the N+ layer is formed in the vicinity of the surface of the substrate 1.

The electric charges stored in the storage well 4 are transferred to the modulation well 6 through the transfer transistor forming region TT, which will be described hereinafter, and is stored in the carrier pocket 7. The source potential, of which the modulation transistor forming region TM functions as a modulation transistor, corresponds to the quantity of the electric charges transferred to the modulation well 6. In other words, it corresponds to the incident light cast on the photodiode forming area PD that functions as a photodiode.

On the surface of the substrate 1 in the vicinity of the storage well 4, a diffusion region 14 for discharging unnecessary electric charges, which contains overflow charges with a high density P++ type diffusion layer (hereinafter, OFD region 14), is formed. The OFD region 14 discharges the electric charges, which are not stored in the storage well 4 and overflow from that storage well 4, and which do not contribute to the pixel signal, to the substrate.

Hereinafter, the transfer transistor forming region TT is described. As shown in FIG. 2, the transfer transistor forming region TT has a carrier pocket TCP, which temporarily retains electric charges, in the substrate.

More specifically, within one sensor cell, between the photodiode forming region PD and the modulation transistor forming region TM, the transfer transistor region TT is formed on the surface side of the substrate. In the transfer transistor region TT, a transfer gate 22 is disposed on the surface of the substrate with a gate insulation film 21 therebetween. Thus a channel is formed on the substrate surface. The channel of the transfer transistor region TT, in other words the transfer route, is controlled by an applied voltage at the transfer gate 22, and a voltage given to an N+ diffusion layer 25.

Under the transfer gate 22, the carrier pocket region TCP is installed. In the carrier pocket region TCP, the P layer, which functions as a transfer storage well 23, is formed on the N-type well 3 in the modulation transistor forming region TM. Within the transfer storage well 23, the transfer carrier pocket 24 of P+ diffusion, is formed.

Moreover, the transfer gate 22 is formed on the surface of the substrate with the gate insulation film 21 therebetween, and a part of the transfer gate 22 overlaps the storage well 4 as viewed in plan (shown as 4a in FIG. 2).

Further, the N+ diffusion layer 25 is formed in approximately the entire surface of the substrate, between the transfer storage well 23 and the modulation transistor forming region TM. Under the N+ diffusion layer 25, a diffusion layer 26 of P-type is formed. With this N+ diffusion layer 25, it is possible to effectively control the potential barrier of a transfer route 26 that is provided in between the carrier pocket 24 under the transfer gate 22 and the carrier pocket 7 under the modulation transistor. At the same time, the diffusion layer 26 can be buried under the N+ diffusion layer 25, thus the N+ diffusion layer 25 can exercise its function as the pinning layer, and suppress the generation of dark current.

As shown in FIG. 1, the transfer gate 22 in the transfer transistor region TT has an approximately rectangular shape, along one side of the rectangular photodiode forming area PD. Here, as shown in FIG. 1 in the embodiment, the ring gate 5 is installed in the vicinity of one corner of the photodiode forming region PD. Hence the portion of the transfer gate 22 on the ring gate 5's side in each transfer transistor area TT, has a shape of which a part is cut off along the shape of the ring gate.

Furthermore, the carrier pocket 24 (not shown in FIG. 1) is formed on the internal side of the transfer gate 22 in FIG. 1, when viewed from the orthogonal direction to the surface of the substrate.

Moreover, as shown in FIG. 1, at the prescribed location in the transfer gate 22, a gate contact region 22a of the N+ layer is formed in the vicinity of the surface of the substrate 1.

Hereinafter, while referring to FIG. 1, the arrangement of the plurality of sensor cells is described in more detail.

As described above, the transfer transistor forming region TT is installed between the photodiode forming region PD and the corresponding modulation transistor forming region TM. The transfer gate 22, which is in the transfer transistor Tr, formed in the transfer transistor forming region TT, has an approximately rectangular shape, having a portion that goes along one side of the photodiode forming region PD and a portion which is cut off along the external rim shape of the ring gate 5 (in FIG. 1, octagon). This transfer gate 22 is installed on the surface of the substrate 1, having the gate insulation film 21 in between.

Further, as shown in FIG. 1, the photodiode forming region PD and the transfer transistor forming region TT, each having an approximately rectangular shape, are arranged within one sensor cell. The two transfer transistor forming regions TT, both being adjacent in longitudinal direction (one of the two-dimensional matrix directions), form a shape where each has a corner cut off.

Here, each of the two adjacent transfer transistor forming regions TT shapes, which have portions cut off, is arranged to face the other.

Figure 3:
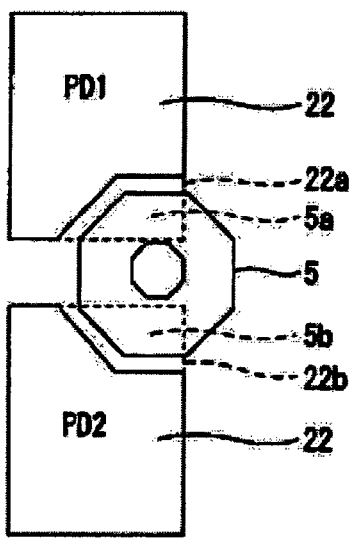
FIG. 3 is a top view drawing showing the location relationship of the ring gates in the embodiment.

FIG. 3 is a top view drawing for describing the relationship in locations between these two transfer gates 22 in the two adjacent transfer transistor forming regions TT, and the ring gate 5. As shown in FIG. 3, every pair of the transfer gates 22 in the transfer transistor forming regions TT, which are adjacent in the longitudinal direction of the two-dimensional matrix, has portions 22a and 22b, which are the cut-off corners that are part of the adjacent approximately rectangular shapes. In the location where the portions 22a and 22b are opposed to each other, one ring gate 5 is installed.

In other words, the ring gate 5 is installed in a way that parts 5a and 5b thereof overlap with the portions 22a and 22b, which are the cut-off corners that are part of the adjacent approximately rectangular shapes in the two transfer transistor forming regions TT, when viewed from the orthogonal direction to the surface of the substrate. Moreover, the ring gate 5 is included in the modulation transistor Tm formed in the modulation transistor forming region TM. Consequently, one modulation transistor Tm is installed for every pair of transfer transistor forming regions TT that are adjacent in one direction of the two dimensional matrix.

That is to say, the transfer transistor Tr formed in the transfer transistor forming region TT is installed for every photodiode forming region PD. One pair of transfer transistors Tr corresponds to both of the storage wells 4 in one pair of photodiode forming regions PD and to one modulation well 6. It changes the potential barriers in both of the optically generated charge transfer routes that are provided between each of the storage well 4 in the pair of photodiode forming regions PD, and one corresponding modulation well 6. It also functions as a transfer controlling element for controlling the transfer of the optically generated charge.

One ring gate is installed for two sensor cells, in other words one pair of sensor cells. Consequently, as shown in FIG. 1, two photodiode forming regions PD1 and PD2 share one ring gate 5 (1). The two photodiode forming regions PD3 and PD4, adjacent to the above, share one ring gate 5 (2). The two sensor cells that share one ring gate are hereinafter referred to as "pair of sensor cells". Consequently, if, for example, there are n lines (n is an integer) in longitudinal direction of the two dimensions in FIG. 1, then the number of ring gates installed in that direction is (n/2). Moreover, if the sensor array has n*m pixels in matrix form (m is an integer), the number of instances of the ring gate 5 is ((n/2)*m).

Pairs of sensor cells C are respectively installed in the areas set between the source lines S, the drain lines D, and the transfer gate lines TX (1), TX (2), TX (3) and so forth. In contrast, the plurality of gate lines G (1), G (2), G (3) and so forth are installed so that they are between the two photodiode forming regions PD in each of the pairs of sensor cells C. Consequently, the transfer gate lines TX (1), TX (2), TX (3) and so forth and the gate lines G (1), G (2), G (3) and so forth are arranged alternately in the longitudinal direction. In the part of the ring-like shaped gate 5 (described later), the gate lines G (1), G (2), G (3) and so forth are formed in a curve along the shape of the gate 5.

The wiring layer, provided with the above-mentioned transfer gate lines TX (1), TX (2), TX (3) and so forth, as well as the source lines S or the like, is formed through the inter layer insulation film (not shown) on the surface of the substrate. The transfer gate 22 and the source contact region 12a or the like are electrically connected to each wiring in the wiring layer with contact holes opened in the inter layer insulation film. Each wiring may be composed with metallic material such as aluminum etc.

Figure 4:
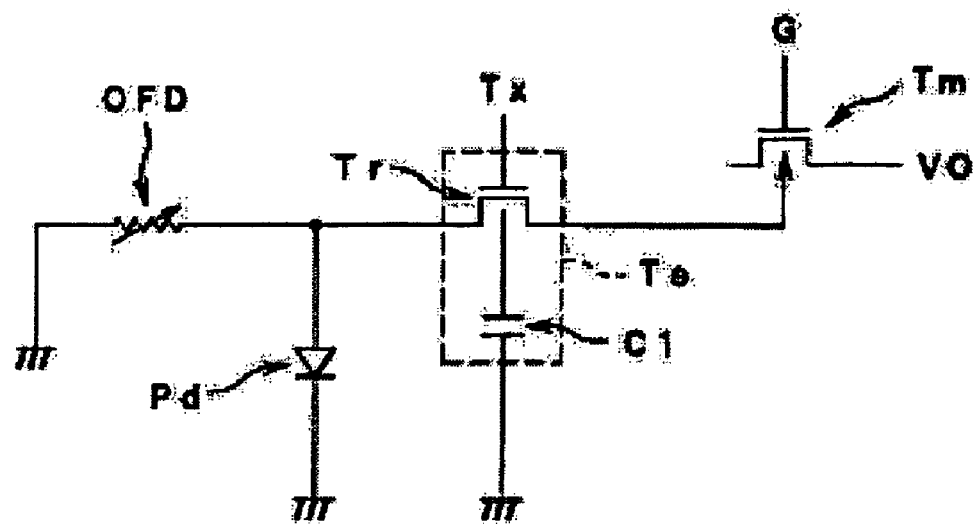
FIG. 4 is a drawing of an equivalent circuit of the sensor cell in the solid state imaging device in one embodiment of the invention.

FIG. 4 is a drawing of an equivalent circuit of the sensor cell in the solid state imaging device in the embodiment. The sensor cell C is provided with a photodiode Pd materialized in the photodiode forming region PD, the modulation transistor Tm materialized in the modulation transistor forming region TM, and the transfer transistor Tr materialized as the transfer controlling element materialized in the transfer transistor forming region TT.

Electric charges (optically generated charges), generated at the photodiode Pd that conducts a photoelectric conversion, are transferred to the carrier pocket 7 in the modulation transistor Tm, by controlling the transfer gate 22 in the transfer transistor Tr, causing it to have a prescribed voltage.

The electric charge is retained in the carrier pocket 7, which makes the modulation transistor Tm equivalent to the change of a back gate bias, and the threshold voltage of the channel is changed according to the quantity of the electric charge stored in the carrier pocket 7. Consequently, an output voltage VO from the modulation transistor Tm corresponds to the electric charge in the carrier pocket 7, in other words to the brightness of the incident light cast to the photodiode Pd.

Further, a variable resistor OFD shown in FIG. 4, is connected to one end of the photodiode Pd. The OFD region 14 is indicated with the variable resistor OFD, so as to change the potential corresponding to the given potential.

Figure 5:
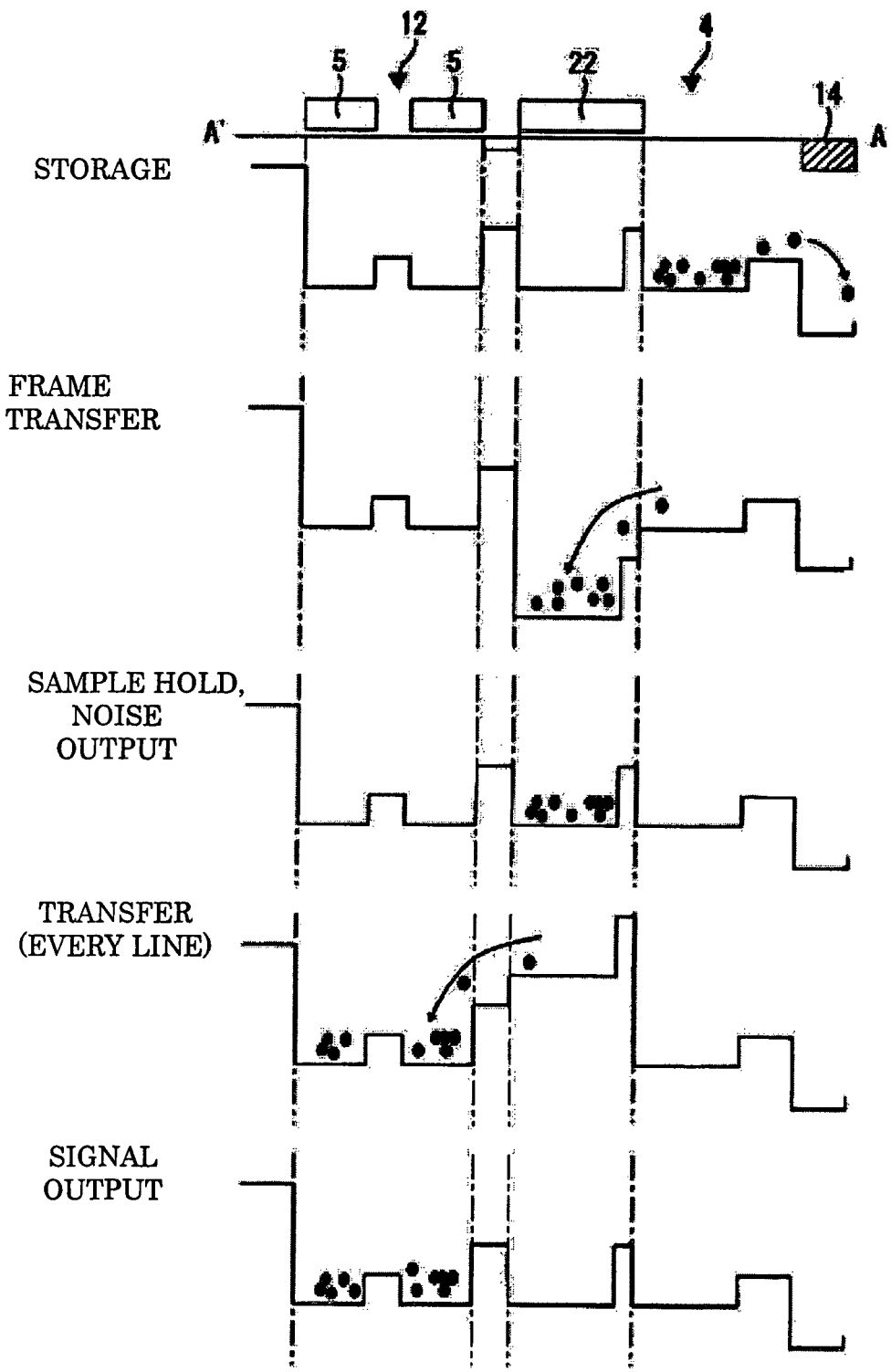
FIG. 5 is a drawing of potentials in each mode of the solid state imaging device in one embodiment of the invention.

FIG. 5 is a drawing of potentials showing the status of potentials in each mode of the solid state imaging device. FIG. 5 exhibits the potentials in (from the top): a storage mode (M1), a frame transfer mode (M2), a retention and noise output mode (M3), a transfer mode (M4), and a signal output mode (M5). The direction to which the potential of the positive hole increases is set to positive, for showing relations between potentials in each mode.

In FIG. 5, the relations between potentials at each of the locations set along the line A-A' of FIG. 1, are shown, where the locations make up the horizontal axis and the potential of the hole is a base of the vertical axis. From the left to the right side of FIG. 5, potentials in the substrate are shown for the locations such as; one end of the ring gate 5, the source region 12, the other end of the ring gate 5, the transfer gate 22 in the transfer transistor Tr, the storage well 4, and the OFD region 14.

In the storage mode (M1), a voltage is applied to the transfer gate 22 in the transfer transistor Tr, so that a high potential barrier is formed between the storage well 4 and the carrier pocket 24. The potential in the OFD region 14 is lower than the potential in the region of the transfer gate 22. This is done in order to discharge the overflowed electric charge from the storage well 4 into the OFD region 14. As a process for storing electric charges, controlling the potential barrier in the transfer route with a gate voltage of the transfer transistor Tr, for the entire pixels at once, and storing the optically generated charges from the photoelectric conversion element to the storage well 4, while preventing the charges from flowing to the carrier pocket 24 in the very least through the transfer route, is performed.

In the frame transfer mode (M2), a first prescribed low voltage is applied to the transfer gate 22 in the transfer transistor Tr, so that a potential barrier is not formed between the storage well 4 and the carrier pocket 24. Here, since the potential of the carrier pocket 24 is lower than that of the storage well 4, the electric charges stored in the storage well 4 flow into the carrier pocket 24. Consequently, as a process for frame transfer of electric charges, for the entire pixels at once, controlling the potential barrier in the transfer route with the gate voltage of the transfer transistor Tr, and transferring the optically generated charges stored in the storage well 4 to the carrier pocket 24, is performed.

In the retention and noise output mode (M3), a voltage is applied to the transfer gate 22 in the transfer transistor Tr, so that a high potential barrier is formed between the storage well 4 and the carrier pocket 24. Consequently, the electric charges flowed into the carrier pocket 24 are retained in the carrier pocket 24. Moreover, in this status, the reset and read-out of the noise component is performed, as described later. That is to say, as a process for modulating the noise component, controlling the potential barrier in the transfer route with the gate voltage of the transfer transistor Tr, and reading out the noise component in the carrier pocket 7, while preventing the optically generated charges from flowing to the carrier pocket 7, is performed.

In the transfer mode (M4), in which the transfer is performed for every line, a second prescribed high voltage is applied to the transfer gate 22 in the transfer transistor Tr, so that the potential barrier is not formed between the carrier pocket 24 and the modulation well 6. Here, since the potential of the modulation well 6 is lower than that of the carrier pocket 24, the electric charges stored in the carrier pocket 24 flow into the modulation well 6. Consequently, as a process for transferring the electric charges by every line; controlling the potential barrier in the transfer route, with the gate voltage of the transfer transistor Tr, and transferring the optically generated charges stored in the carrier pocket 24 to the carrier pocket 7, is performed.

In the signal output mode (M5), a voltage is applied at the transfer gate 22 in the transfer transistor Tr, so that a high potential barrier is formed between the carrier pocket 24 and the modulation well 6. Consequently, the electric charges flowed into the modulation well 6 are retained in the modulation well 6. Moreover, in this status, the read-out of the signal component is performed, as described later. That is to say, as a process for modulating the signal component, controlling the potential barrier in the transfer route with the gate voltage of the transfer transistor Tr and with a drain voltage, and outputting a pixel signal that corresponds to the optically generated charges from the carrier pocket 7, while retaining the optically generated charges in the modulation well 6, is performed.

Figure 6:
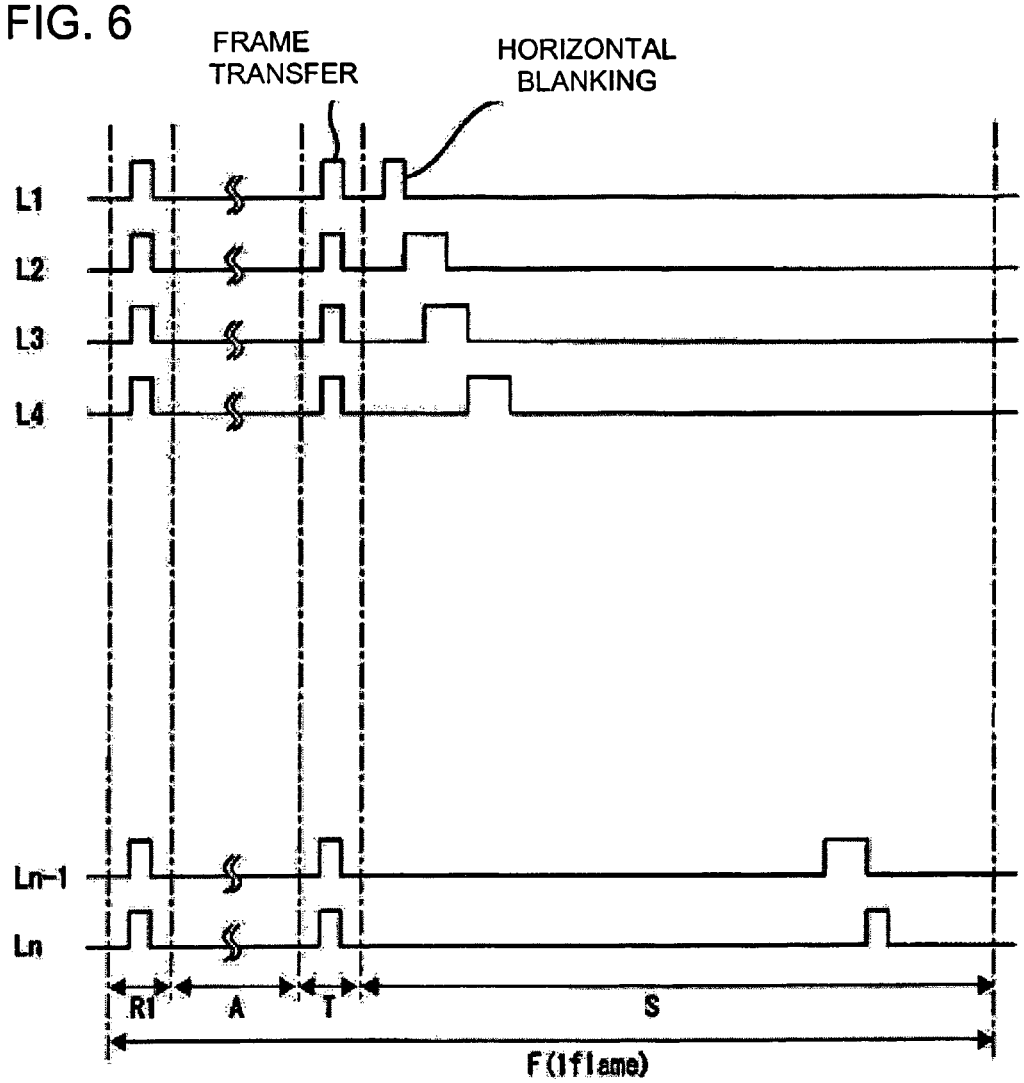
FIG. 6 is a timing chart showing the driving sequence in one embodiment of the invention.

Hereinafter, a method for driving the solid state imaging device described in the structure above is described using FIGS. 6 and 7, along the operation sequence. FIG. 6 is a timing chart showing the driving sequence of the solid state imaging device in one of the embodiments in the invention. As shown in FIG. 6, one frame period F includes a reset period (R1), a storing period (A), a frame transfer period (T), and a pixel signal read-out period (S).

The reset period (R1) is a synchronous reset period of the entire cells, for resetting the entire pixels synchronously, in other words resetting the entire sensor cells at once, at the start of one frame. The reset operation performed during this reset period (R1) is the operation for discharging the remaining electric charges of all the pixels, from the storage well 4, the transfer storage well 23, and the modulation well 6. After the reset operation, storing the electric charges to the storage well 4 in each sensor cell, starts.

The storing period (A) that subsequently follows the reset period (R1) is the period for storing the optically generated charges, generated in the photodiode forming region PD by receiving light when each sensor cell is in the storage mode (M1), in the storage well 4.

The frame transfer period (T) that subsequently follows the storing period (A) is the period for frame transfer of electric charge stored in each photodiode forming region PD for the entire pixels at once, in other words for the entire cells at once, to the carrier pocket region TCP, when each sensor cell is in the frame transfer mode (M2). The frame transfer operation in this frame transfer period (T) is performed, by applying the prescribed first voltage simultaneously to the above-mentioned transfer gate 22 in the transfer transistor Tr.

After the frame transfer mode (M2), the status transits to the retention of electric charges in the carrier pocket region TCP, in other words to the above mentioned retention and noise output mode (M3).

As shown in FIG. 6, the pixel signal read-out period (S), the subsequent period after the frame transfer period (T), is provided with a horizontal blanking period (H), which transfers, per each selected line, the electric charges retained in the carrier pocket region TCP to the modulation transistor forming region TM. More specifically, as shown in FIG. 6, a sequence of horizontal blanking periods (H) occurs during the pixel signal read-out period (S), for n lines (from a first line L1 to a last line Ln), sequentially, consecutively deviating in time.

Figure 7:
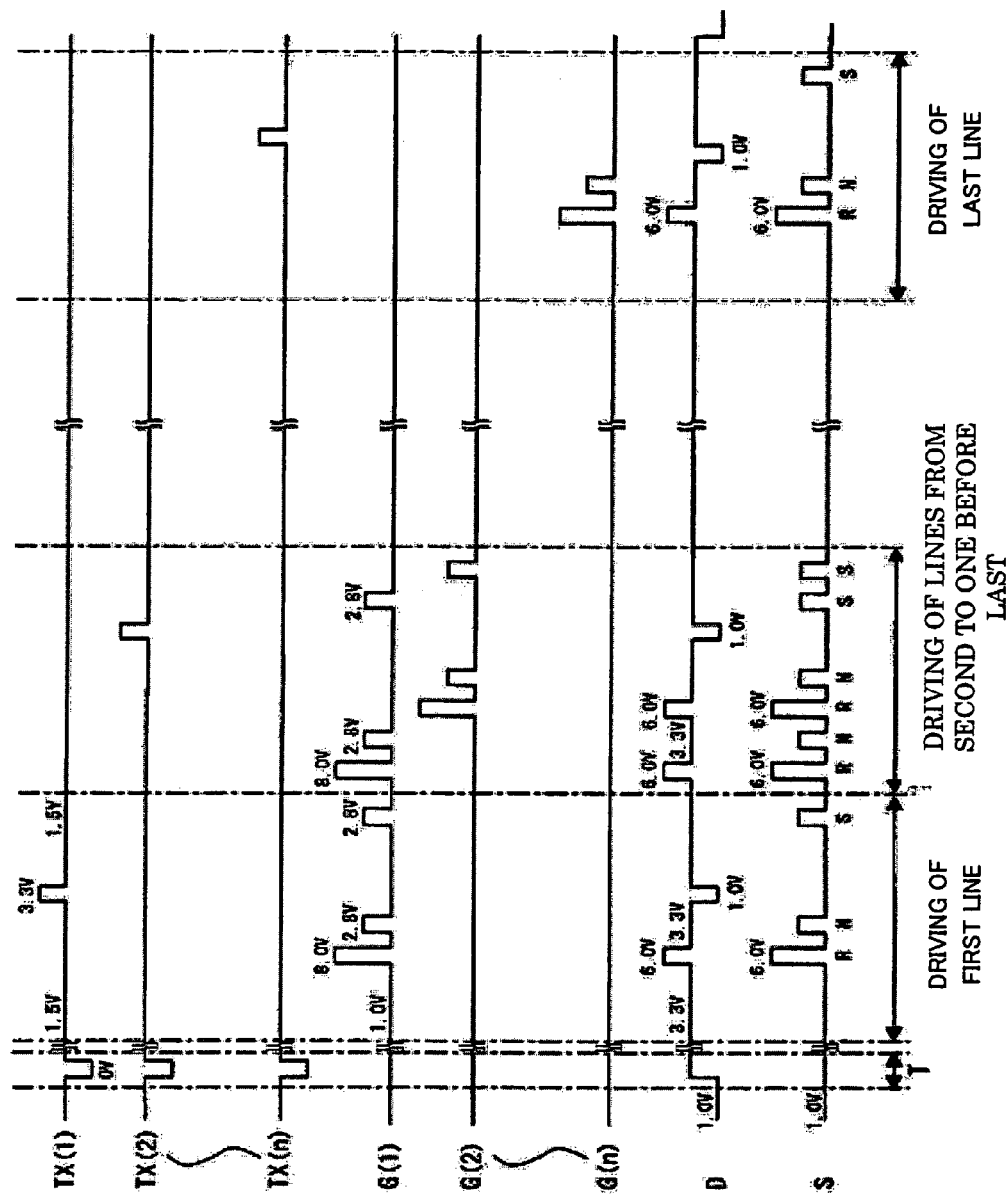
FIG. 7 is a timing chart of the horizontal blanking periods in one embodiment of the invention.

FIG. 7 is a timing chart for describing the frame transfer period (T) and the horizontal blanking period (H). The horizontal blanking period (H) takes place in every selected line. FIG. 7 exhibits the wave shape of voltages applied to the transfer gate 22 in the transfer transistor Tr, the gate 5 in the modulation transistor Tm, the source 12, and the drain 13, during the frame transfer period (T) and the horizontal blanking period (H).

The transfer gate line TX (1) shown in FIG. 1 is connected only to the transfer gate 22 in the transfer transistor Tr in each cell at the first line. The transfer gate line TX (2) is connected to the transfer gate 22 in the transfer transistor Tr in each cell at the second and the third lines. Similarly, the transfer gate line TX (k) is connected to the transfer gate 22 in the transfer transistor Tr in each cell at line number (2k−2) and line number (2k−1). Here, k is an integer smaller than n. The transfer gate line TX ((n/2)+1) at the last line (line number n) is connected only to the transfer gate 22 in the transfer transistor Tr in each cell at line number n.

Moreover, the gate line G (1) is connected to the ring gate 5 in the modulation transistor Tm in each cell at the first and the second lines. The gate line G (2) is connected to the ring gate 5 in the modulation transistor Tm in each cell at the third and the forth lines. Similarly, the gate line G (k) is connected to the ring gate 5 in the modulation transistor Tm in each cell at line number (2k) and line number (2k+1).

At the time of frame transfer, simultaneously for each pixel element, the transfer transistor Tr is controlled and the electric charges stored in the storage well 4 are transferred to the carrier pocket 24.

In the frame transfer period (T), each transfer gate 22 changes from 1.5V to 0V, and the drain 13 changes from 1.0V to 3.3V, whereas the source 12 is at 1.0V and each gate 5 is at 1.0V.

Subsequently, in the case of reading out the pixel signals at the first line, first, as a reset operation, each voltage at the gate line G (1), the drain line D and the source line S are controlled, and all the electric charges in the carrier pocket 7 in each modulation transistor Tm that corresponds to the first line are discharged. More specifically, at the time of this reset, the gate line G (1) changes from 1.0V to 8V, the drain line D from 3.3V to 6.0V, and the source line S from 1.0V to 6.0V.

Thereafter, as a read-out operation of the noise component of pixel signals at the first line, each voltage at the gate line G (1), the drain line D and the source line S are controlled, and the noise component is read out, based on the electric charges remaining in the carrier pocket 7 in each modulation transistor Tm that corresponds to the first line. More specifically, at the time of this noise component read-out, the gate line G (1) changes from 1.0V to 2.8V, whereas the drain line D is at 3.3V, and the voltage for the noise component is output to the source line S.

Thereafter, as a transfer operation in which the electric charges stored in the carrier pocket 24 in the transfer transistor forming region TT, are transferred to the carrier pocket 7, each voltage at the transfer gate line TX (1) and the drain line D is controlled, and the electric charges stored in each storage well 4 at the first line are transferred to the corresponding carrier pocket 7. More specifically, at the time of this transfer operation, the transfer gate line TX (1) changes from 1.5V to 3.3V, and the drain line D from 3.3V to 1.0V, whereas the source line S is at 1.0V.

Thereafter, as a read-out operation of the signal component of pixel signals at the first line, each voltage at the gate line G (1) and the source line S is controlled, and the signal component is read out, based on the electric charges retained in the carrier pocket 7 in each modulation transistor Tm that corresponds to the first line. More specifically, at the time of this signal component read-out, the gate line G (1) changes from 1.0V to 2.8V, and the voltage for the signal component is output to the source line S.

The pixel signal read-out for the first line is performed thereby.

Hereinafter, the read-out operation of the pixel signal at the second line and on is described. The second and third lines are located between the two gate lines G(1) and G (2), and at the center in between those two lines, the transfer gate line TX (2) is located.

The transfer gate line TX (2) is used, not only for transferring the electric charges in each photodiode forming region PD at the second line to the carrier pocket 7 in the corresponding modulation transistor Tm, but also for transferring the electric charges in each photodiode forming region PD at the third line to the carrier pocket 7 in the corresponding modulation transistor Tm.

Moreover, the gate line G (1) is used for outputting the pixel signal that corresponds to the electric charges from each photodiode forming region PD at the second line. The gate line G (2) is used for outputting the pixel signal that corresponds to the electric charges from each photodiode forming region PD at the third line.

Consequently, first as a reset operation, each voltage at the gate line G (1), the drain line D and the source line S is controlled, and all the electric charges in the carrier pocket 7 in each modulation transistor Tm that corresponds to the second line are discharged. More specifically, at the time of this reset, the gate line G (1) changes from 1.0V to 8V, the drain line D from 3.3V to 6.0V, and the source line S from 1.0V to 6.0V.

Thereafter, as a read-out operation of the noise component of pixel signals at the second line, each voltage at the gate line G (1), the drain line D and the source line S is controlled, and the noise component is read out, based on the electric charges remaining in the carrier pocket 7 in each modulation transistor Tm that corresponds to the second line. More specifically, at the time of this noise component read-out, the gate line G (1) changes from 1.0V to 2.8V, whereas the drain line D is at 3.3V, and the voltage for the noise component is output to the source line S.

Further, thereafter, as a reset operation, each voltage at the gate line G (2), the drain line D and the source line S is controlled, and all the electric charges in the carrier pocket 7 in each modulation transistor Tm that corresponds to the third line are discharged. More specifically, at the time of this reset, the gate line G (2) changes from 1.0V to 8V, the drain line D from 3.3V to 6.0V, and the source line S from 1.0V to 6.0V.

Thereafter, as a read-out operation of the noise component of pixel signals at the third line, each voltage at the gate line G (2), the drain line D and the source line S is controlled, and the noise component is read out, based on the electric charges remaining in the carrier pocket 7 in each modulation transistor Tm that corresponds to the third line. More specifically, at the time of this noise component read-out, the gate line G (2) changes from 1.0V to 2.8V, whereas the drain line D is at 3.3V, and the voltage for the noise component is output to the source line S.

That is to say, in the longitudinal direction of the matrix in FIG. 1, the gate line G (1), installed corresponding to a pair of photodiode forming regions PD1 and PD2, is controlled and reset, and the noise component of the modulation transistor Tm is read out, while preventing the electric charges from moving from a set of carrier pockets 24 in the transfer transistor forming regions TT. Further, the gate line G (2), installed corresponding to a pair of photodiode forming regions PD3 and PD4, is controlled and reset, and the noise component of the photodiode forming region PD 3 is read out, while preventing the electric charges from moving from a set of carrier pockets 24 in the transfer transistor forming regions TT.

Subsequently, as a transfer operation in which the electric charges stored in the carrier pocket 24 in the transfer transistor forming region TT are transferred to the carrier pocket 7, each voltage at the transfer gate line TX (2) and the drain line D is controlled, and the electric charges stored in the each carrier pocket 24 at the second and the third lines are transferred to the corresponding carrier pocket 7. More specifically, at the time of this transfer operation, the transfer gate line TX (2) changes from 1.5V to 3.3V, and the drain line D from 3.3V to 1.0V, whereas the source line S is at 1.0V.

Thereafter, first, as a read-out operation of the signal component of pixel signals at the second line, each voltage at the gate line G (1) and the source line S is controlled, and the signal component is read out, based on the electric charges retained in the carrier pocket 7 in each modulation transistor Tm that corresponds to the second line. More specifically, at the time of this signal component read-out, the gate line G (1) changes from 1.0V to 2.8V, and the voltage for the signal component is output to the source line S.

Similarly, subsequent to the above, as a read-out operation of the signal component of pixel signals at the third line, each voltage at the gate line G (2) and the source line S is controlled, and the signal component is read out, based on the electric charges retained in the carrier pocket 7 in each modulation transistor Tm that corresponds to the third line. More specifically, at the time of this signal component read-out, the gate line G (2) changes from 1.0V to 2.8V, and the voltage for the signal component is output to the source line S.

That is to say, in the longitudinal direction of the matrix in FIG. 1, the transfer gate line TX (2), installed corresponding to the photodiode forming regions PD2 and PD3, is controlled, and the electric charges are moved from the set of carrier pockets 24 in the transfer transistor forming regions TT to the modulation well 6. Further, the gate line G (1) is controlled and the signal component in the photodiode forming region PD2 is read out. Still further, the gate line G (2) is controlled and the signal component in the photodiode forming region PD3 is read out.

Hereinafter, similar to the mechanism at the second and the third lines mentioned above, the reset, the noise component read-out, and the signal component read-out are performed for the forth and fifth lines. In a similar manner, the signal component read-out is performed until the last line, line number (n−1).

In the case of reading out the pixel signals at the final line, line number n, first, as a reset operation, each voltage at the gate line G ((n/2)−1), the drain line D, and the source line S is controlled, and all the electric charges in the carrier pocket 7 in each modulation transistor Tm in the line number n are discharged. More specifically, at the time of this reset, the gate line G ((n/2)−1) changes from 1.0V to 8V, the drain line D from 3.3V to 6.0V, and the source line S from 1.0V to 6.0V.

Thereafter, as a read-out operation of the noise component of pixel signals at line number n, each voltage at the gate line G ((n/2)−1), the drain line D, and the source line S is controlled, and the noise component is read out, based on the electric charges remaining in the carrier pocket 7 in each modulation transistor Tm that corresponds to line number n. More specifically, at the time of this noise component read-out, the gate line G ((n/2)−1) changes from 1.0V to 2.8V, whereas the drain line D is at 3.3V, and the voltage for the noise component is output to the source line S.

Thereafter, as a transfer operation in which the electric charges stored in the carrier pocket 24 in the transfer transistor forming region TT are transferred to the carrier pocket 7, each voltage at the transfer gate line TX ((n/2)+1) and the drain line D is controlled, and the electric charges stored in each storage well 4 at line number n is transferred to the corresponding carrier pocket 7. More specifically, at the time of this transfer operation, the transfer gate line TX ((n/2)+1) changes from 1.5V to 3.3V, and the drain line D from 3.3V to 1.0V, whereas the source line S is at 1.0V.

Thereafter, as a read-out operation of the signal component of pixel signals at line number n, each voltage at the gate line G ((n/2)−1), and the source line S is controlled, and the signal component is read out, based on the electric charges retained in the carrier pocket 7 in each modulation transistor Tm that corresponds to the line number n. More specifically, at the time of this signal component read-out, the gate line G ((n/2)−1) changes from 1.0V to 2.8V, and the voltage for the signal component is output to the source line S. The pixel signal read-out for line number n is performed thereby.

Consequently, the CDS function is attained by reading out the noise component prior to the subsequent read-out of the signal component.

As described above, with the solid state imaging device in one embodiment of the invention, controlling the voltage at the ring gate 5, which is installed corresponding to the pair of transfer transistor forming regions TT that are adjacent in one direction of the matrix; and reading out the noise component from the modulation transistor Tm, as well as reading out the signal component based on the transferred optically generated charges, are performed. Moreover, the optically generated charges are transferred, from one of the two carrier pockets 24 in the pair of transfer transistors adjacent in one direction of the matrix, to the carrier pocket 7.

Therefore, with the solid state imaging device in one embodiment of the invention, it is possible to attain the synchronous electronic shutter function while attaining the CDS function. Further, with the solid state imaging device in one embodiment of the invention, one ring gate is installed for two photodiode forming regions PD, hence the cell pitch can be materialized to be microscopic in the modulation type MOS sensor.

The invention shall not be limited to the above-mentioned embodiment, and it is intended that within the main scope of the invention, various other kinds of modifications and alternation etc., is possible.

What is claimed is:

1. A solid state imaging device, comprising:
    a first photoelectric conversion element that generates electric charges corresponding to an incident light;
    a circuit element including a first gate electrode, a terminal, a first well, and a first carrier pocket formed in the first well, the first carrier pocket overlapping the first gate electrode, a potential of the terminal being controlled corresponding to electric charges stored in the first carrier pocket; and
    a transfer element positioned between the first photoelectric conversion element and the circuit element, the transfer element transferring electric charges between the first photoelectric conversion element and the circuit element, the transfer element including a second gate electrode, a second well separated from the first well, and a second carrier pocket formed in the second well, the second carrier pocket overlapping the second gate electrode.

2. The solid state imaging device according to claim 1, the first photoelectric conversion element including an accumulating well that stores electric charges, the transfer element including a high potential portion overlapping with the second gate electrode, the high potential portion being positioned between the accumulating well and the second well, a potential of the high potential portion being higher than a potential of the second well.

3. The solid state imaging device according to claim 2, the first well having a p-type conductivity, the first carrier pocket having a p-type conductivity, the second well having a p-type conductivity and the second carrier pocket having a p-type conductivity.

4. The solid state imaging device according to claim 3, further comprising:
    an n-type diffusion portion positioned between the first p-type well and the second p-type well; and
    a p-type diffusion portion positioned between the first p-type well and the second p-type well, the n-type diffusion portion and the p-type diffusion portion overlapping each other, a thickness of the p-type diffusion portion and a thickness of the first p-type well being different.

5. The solid state imaging device according to claim 2, further comprising:
    a second photoelectric conversion element generating electric charges corresponding to an incident light, the transfer element being positioned between the second photoelectric conversion element and the circuit element, the transfer element transferring electric charges between the second photoelectric conversion element and the circuit element.

6. The solid state imaging device according to claim 5, further comprising:
    an n-type diffusion portion positioned between the first p-type well and the second p-type well; and
    a p-type diffusion portion positioned between the first p-type well and the second p-type well, the n-type diffusion portion and the p-type diffusion portion overlapping each other, a thickness of the p-type diffusion portion and a thickness of the first p-type well being different.

7. The solid state imaging device according to claim 2, the circuit element including a gate, a source and a drain, the terminal being electrically connected to the source of the circuit element.

8. A solid state imaging device, comprising:
    a p-type accumulating well storing electric charges generated in a photoelectric conversion element;
    a first gate electrode;
    a first p-type well overlapping the first gate electrode and configured to store electric charges inside;
    a first p-type carrier pocket formed in the first p-type well;
    a second gate electrode configured to transfer electric charges between the p-type accumulating well and the first p-type carrier pocket;
    a second p-type well separated from the first p-type well, the second p-type well overlapping the second gate electrode and storing electric charges;
    a n-type diffusion portion positioned between the first p-type well and the second p-type well; and
    a p-type diffusion portion positioned between the first p-type well and the second p-type well, the n-type diffusion portion and the p-type diffusion portion overlapping each other, a thickness of the p-type diffusion portion and a thickness of the first p-type well being different.

9. The solid state imaging device according to claim 8, further comprising:
    a high potential portion overlapping with the second gate electrode, the high potential portion being positioned between the accumulating well and the second well, a potential of the high potential portion being higher than a potential of the second well.

10. A method of driving a solid state imaging device that includes:
    a photoelectric conversion element generating electric charges corresponding to an incident light, the photoelectric conversion element including an accumulating well storing electric charges;
    a circuit element including a first gate electrode, a terminal, a first well, and a first carrier pocket formed in the first well, the first carrier pocket overlapping the gate electrode, a potential of the terminal being controlled corresponding to electric charges stored in the first carrier pocket;
    a transfer element positioned between the photoelectric conversion element and the circuit element, the transfer element including a second gate electrode, a second well separated from the first well, and a second carrier pocket formed in the second well, the second carrier pocket overlapping the second gate electrode; and
    a diffusion portion positioned between the first well and the second well, the method comprising:
    accumulating electric charges in the photoelectric conversion element while a potential of the second well is controlled to be greater than a potential of the accumulating well;

transferring electric charges from the accumulating well to the second carrier pocket while a potential of the channel of the transfer element is controlled to be less than a potential of the accumulating well and a potential of the diffusion portion.

11. The method according to claim 10, further comprising:

removing a noise signal by detecting a potential of the terminal while a potential of the second well is controlled to be less than a potential of the diffusion portion and while electric charges are stored in the second carrier pocket.

12. The method according to claim 10, further comprising:

transferring electric charges from the second carrier pocket to the first carrier pocket while a potential of the second well is controlled to be greater than a potential of the diffusion portion.

13. The method according to claim 10, further comprising:

reading an output signal by detecting a potential of the terminal while a potential of the second well is controlled to be less than a potential of the diffusion portion and while electric charges are stored in the first carrier pocket.

* * * * *